(12) United States Patent
Mixon

(10) Patent No.: US 7,199,705 B1
(45) Date of Patent: Apr. 3, 2007

(54) WIRELESS TAILGATE LIGHTS

(76) Inventor: Ronald Mixon, 3818 Barnwell Cir. South, Fernandina Beach, FL (US) 32034

( * ) Notice: Subject to any disclaimer, the term of this patent is extended or adjusted under 35 U.S.C. 154(b) by 163 days.

(21) Appl. No.: 10/992,896

(22) Filed: Nov. 19, 2004

(51) Int. Cl.
B60Q 1/30 (2006.01)

(52) U.S. Cl. .............. 340/479; 340/463; 340/464; 340/467; 340/468; 340/472; 340/573.1; 200/61.89

(58) Field of Classification Search ........... 340/479, 340/463, 464, 467, 468, 472, 477, 431, 573.1; 362/485; 180/282; 200/61.89
See application file for complete search history.

(56) References Cited

U.S. PATENT DOCUMENTS

| | | | |
|---|---|---|---|
| 2,451,915 A | 10/1948 | Buresh | |
| 2,700,188 A | 1/1955 | Buresh et al. | |
| 2,703,441 A | 3/1955 | Langdon et al. | |
| 2,890,497 A | 6/1959 | Langdon et al. | |
| 3,485,706 A | 12/1969 | Evans | |
| 3,797,074 A | 3/1974 | Zafiroglu | |
| 4,859,982 A | 8/1989 | Seaburg | |
| 4,891,262 A | 1/1990 | Nakamae et al. | |
| 4,916,431 A * | 4/1990 | Gearey | 340/479 |
| 5,424,715 A * | 6/1995 | Lietzow et al. | 340/539.1 |
| 5,666,103 A * | 9/1997 | Davis, Jr. | 340/479 |
| 6,036,787 A | 3/2000 | Bennett et al. | |
| 6,100,801 A * | 8/2000 | Plummer | 340/479 |
| 6,486,774 B1 * | 11/2002 | Arnold, Sr. | 340/467 |
| 6,933,839 B2 * | 8/2005 | Henry | 340/479 |

* cited by examiner

Primary Examiner—Davetta W. Goins
(74) Attorney, Agent, or Firm—Lawrence J. Gibney, Jr.

(57) ABSTRACT

This device is a wireless tailgate braking and turn signal System, which will temporarily enable a driver of a vehicle to have taillights and/or a blinker system for emergency situations. This would insure road safety in all types of conditions, both in terms of extremes in temperature and inclement weather.

15 Claims, 4 Drawing Sheets

WIRELESS TAILGATE LIGHTS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

This device addresses the need for roadside safety and in particular portable tailgate lights for emergency situations.

B. Prior Art

The invention relates to the need for temporary taillights with the capability of a blinker system. This is designed to be temporary or to be used only in emergency situations.

A representative patent of this particular technology is Seaburg, U.S. Pat. No. 4,859,982, which is a wireless tailgate system. However, integrating the system into the tailgate circuitry of the vehicle operates the Seaburg patent. Although the need to be satisfied is the same, the operation of the current device is substantially different from Seaburg.

In this current application a sleeve is inserted over the brake pedal. Contained within this sleeve are a series of contact or pressure points which when they are depressed will emit a radio frequency signal. This radio frequency signal will in turn illuminate the taillights. Because the current device will operate every time that the brake pedal is depressed, it is automatic and the operator of the vehicle needs to only think about driving the car or truck. It is anticipated that integration with the turn signal circuitry of the car would be desirable to provide blinker capability.

BRIEF SUMMARY OF THE INVENTION

In most situations where taillights have malfunctioned for any number of reasons, it is important to have proper taillights on equipment especially equipment that is being towed. This equipment may include a trailer, a boat, or a camper.

In the usual case tailgate lights are wired from the pulling or towing vehicle to the tailgate assembly. Unfortunately, when one of these wires breaks the electrical connection is lost and the taillight becomes inoperable. It can sometimes take an hour to rewire these taillights.

This device will quickly enable the driver of the vehicle to install temporary tailgate lights. This would insure proper road safety and also not unduly delay the trip.

The taillights are operated automatically by this device when the brake pedal is depressed. It is anticipated that a blinker assembly may be incorporated into this particular device. The system is designed to be wireless and operate whenever the brake pedal is depressed.

The device will be comprised of a transmitter and a receiver. The transmitter would be contained in a sleeve, which will fit over a standard brake pedal. The transmitter would be equipped with a series of contacts so that when the brake pedal is depressed, the contacts allow a radio frequency to be emitted.

The radio frequency would communicate with the receiver, which would be mounted on the back of the trailer, which is towing the load. The receiver would contain the necessary electrical components to enable the lights to be illuminated.

The device will also be equipped with turn signals, which would be operated from a separate toggle switch, which could be mounted to the dashboard of the vehicle.

It is desirable to make the device as lightweight as possible and allow the receiver to be mounted either with magnets, tie straps or clamps to the trailer for easy installation and removal.

It is an object of this device to insure proper roadside safety on a temporary basis in those situations when the taillights become inoperable-due to a broken or faulty electrical connection. It is a further object to make the device easy to install and easy to remove.

DETAILED DESCRIPTION OF THE EMBODIMENTS

Figure 1:
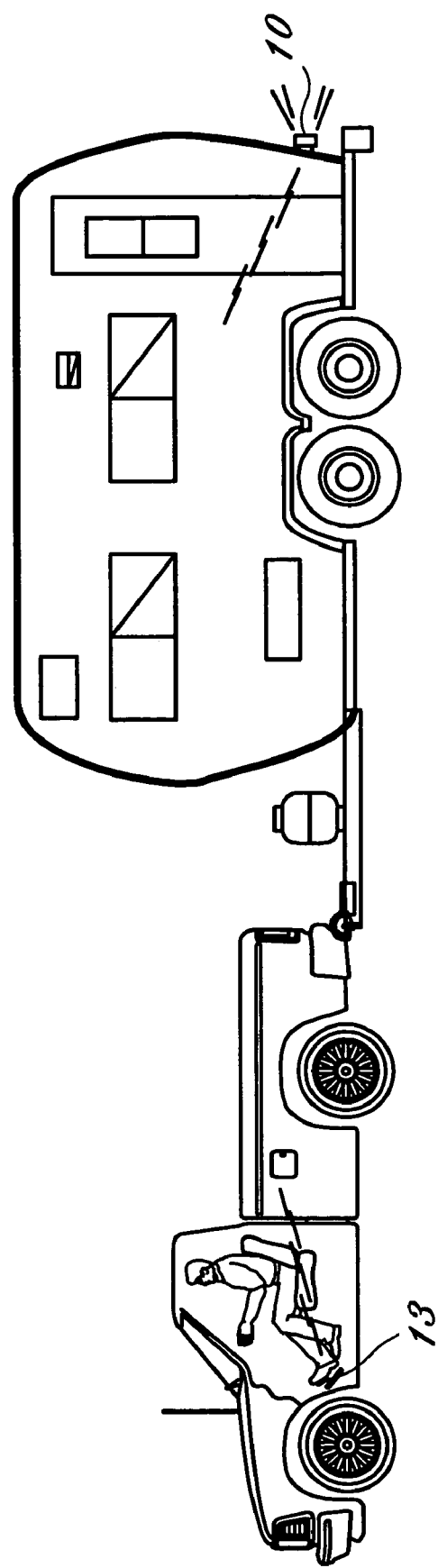
FIG. 1 is a side view of the device installed.
Figure 2:
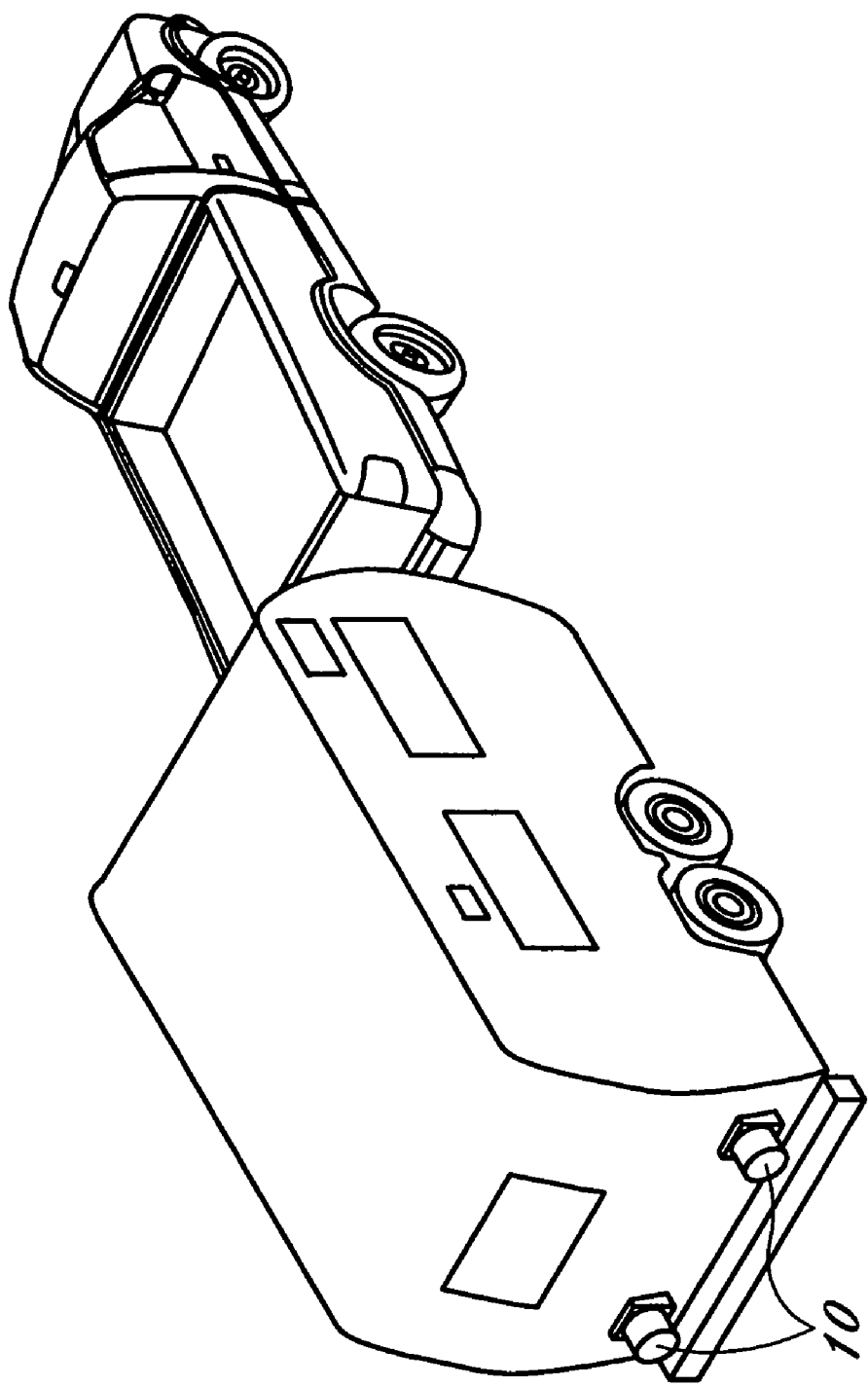
FIG. 2 is a perspective view of the taillights attached to a towed load.
Figure 3:
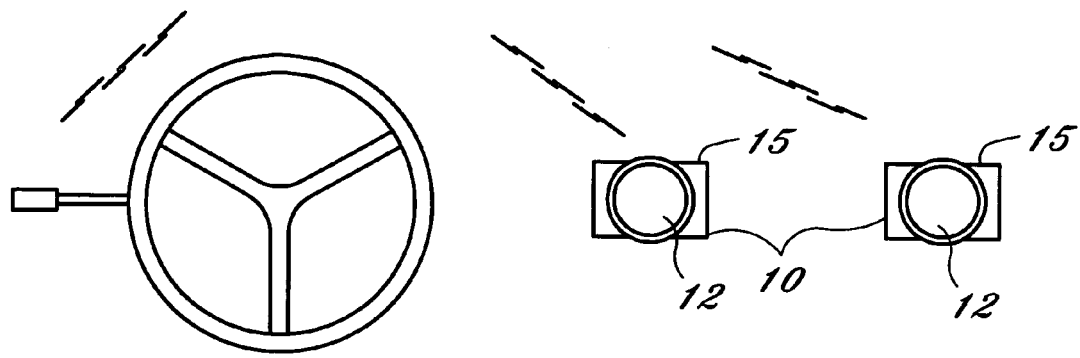
FIG. 3 is a schematic of the radio frequency from the area of the steering wheel to the tail light assembly.

This device is a set of portable brake lights 10, which are operated using a transmitter 20 and a receiver 12. The device is comprised of a sleeve 13, which contains a series of contact points 17. When the brake is depressed the contact points cause the transmitter 20 to emit a radio frequency signal to a receiver 12, which is integrated into the structure, which houses the brake lights 10. FIGS. 1, 2, 3

Figure 4:
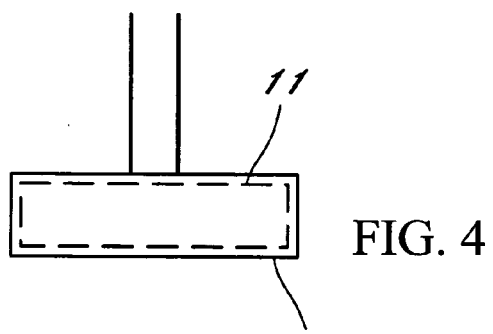
FIG. 4 is a front view of a part of the device inserted over the brake pedal.
Figure 5:
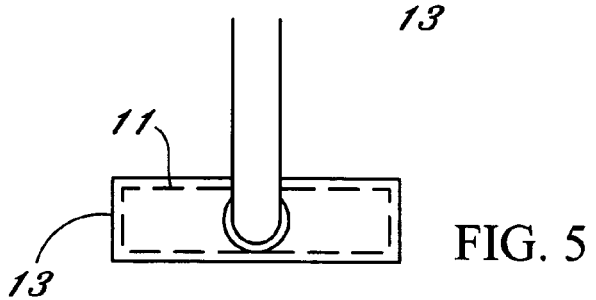
FIG. 5 is a back view of a part of the device inserted over the brake pedal.
Figure 7:
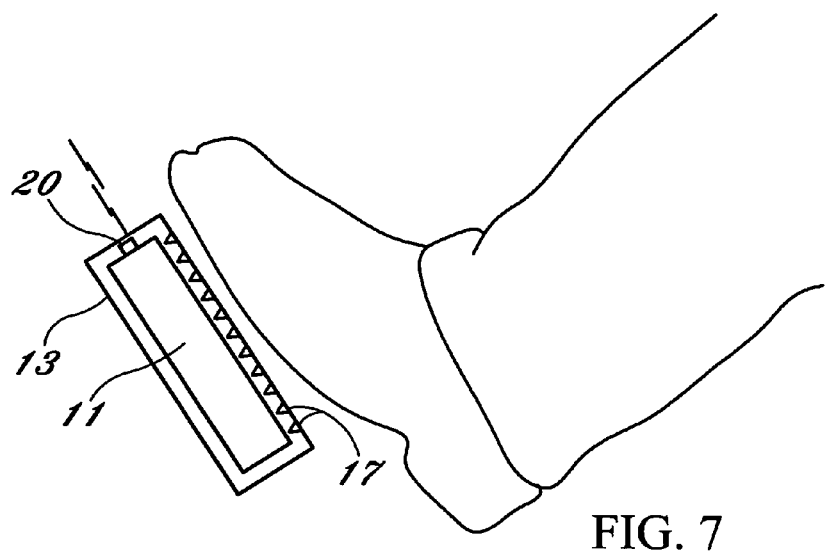
FIG. 7 is a enlarged view of the cross section of the pedal with sleeve attached.

Within the sleeve 13 is a plurality of pressure sensitive contacts 17, which are placed around the brake pedal 11 of the vehicle in such a manner that they are depressed against the brake pedal when the operator of the vehicle operates the brake. FIGS. 4, 5, 7

Figure 6:
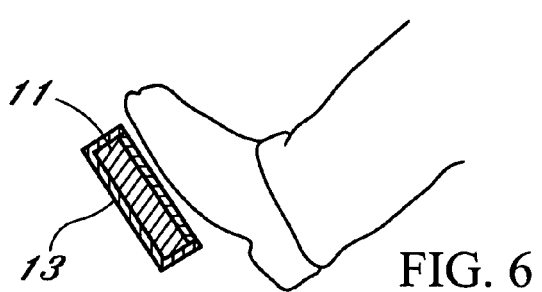
FIG. 6 is a representation of a foot depressing the brake pedal with the device installed.
Figure 8:
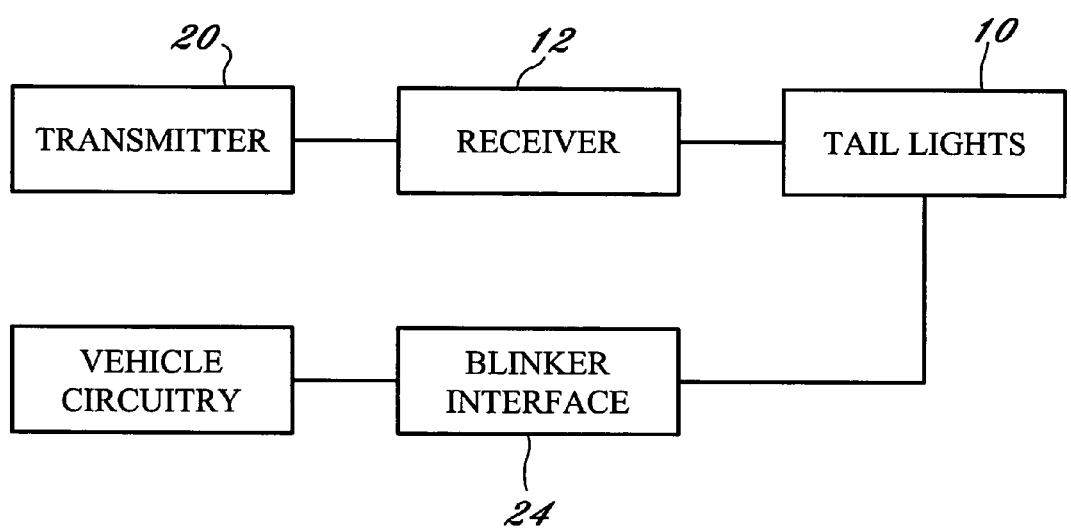
FIG. 8 is a schematic of the device.

When the pedal is depressed and the contact points 17 are depressed a radio signal is emitted by the transmitter 20 and sent to the receiver 12, which is contained with the taillight 10. FIGS. 3, 6, 8

Unlike conventional taillight systems the device and signal are not dependent upon any wiring because it is a radio transmitted signal, which communicates with the receiver 12, contained in a structure mounted to the trailer. FIGS. 1, 2 The receiver 12 is contained within the taillight structure along with all other associated electrical equipment. FIGS. 1, 2, 3

Additionally because the device is operated by the depression of the brake pedal and because part of the device wraps around the brake pedal 11, it will not fall off or be misplaced during operation. Additionally it will be fully automatic in the sense that the illumination of the taillights is controlled not by any toggle switch or button but simply by the normal operation of the towing vehicle.

The receiver 12, which houses the lights is contained within a housing or other mountable structure. A mounting means is also provided to mount the taillights to the towed load. It is anticipated that because most vehicles contain ferrous materials that a set of magnets 15 may be used. The magnets 15 allow the attachment of the box to the end of the trailer with relative ease. Not all towed structures contain ferrous material so therefore other means may also include straps or clamps. FIG. 3

It is also contemplated that a blinker mechanism 24 would be installed in this portable brake light device 10. This blinker mechanism 24 would be operated by interfacing the device with the turn signal circuitry of the vehicle so that when the turn signal is activated, the respective blinker will illuminate. This may be done by a separate toggle switch or by activating a separate radio transmitter that will be operational only when the blinker is operated. FIG. 8 Lights or LEDs may be used to provide illumination to the taillights and blinkers.

In operation, the device 10 would cease to illuminate when the pressure is taken off the brake pedal, or during normal driving operation as the radio connection between the transmitter and receiver is broken.

The construction material would be such that the box that houses the receiver 12 would be durable in all environmental conditions and all extremes in temperature. This may include hard plastic, resins, laminates or even metallic structures such as aluminum or steel.

The inventor claims:

1. A device to provide portable brake lights to be used in cases of emergencies or temporary needs and comprised of:
   a transmitter,
   a receiver,
   a structure containing the receiver,
   an activating mechanism,
   means of attachment for the receiver,
   brake lights;
   wherein the transmitter is contained within a sleeve which is inserted over the brake pedal;
   wherein an activating mechanism provided;
   wherein the activating mechanism is placed within the sleeve;
   wherein the transmitter emits a signal when the activating mechanism is engaged;
   said signal is a radio signal;
   wherein the receiver communicates with the transmitter to receive the signal and illuminate the taillights;
   wherein the receiver is contained in the same structure as the lights;
   wherein a means of attachment for the receiver is provided.

2. The activating mechanism as described in claim 1 is a plurality of contact points.

3. The means of attachment for the receiver as described in claim 1 is a magnet.

4. The means of attachment for the receiver as described in claim 1 is a tie strap.

5. The means of attachment for the receiver as described in claim 1 is a clip.

6. The means of attachment for the receiver as described in claim 1 is a bracket.

7. A device to provide portable brake lights and blinkers to be used in cases of emergencies or temporary needs and comprised of:
   a transmitter,
   a receiver,
   a structure containing the receiver,
   an activating mechanism,
   means of attachment for the receiver,
   brake lights,
   interface with the blinker system of the vehicle;
   wherein the transmitter is contained within a sleeve which is inserted over the brake pedal;
   wherein an activating mechanism is provided;
   wherein the activating mechanism is placed within the sleeve;
   wherein the transmitter emits a signal when the activating mechanism is engaged;
   said signal is a radio signal;
   wherein the receiver communicates with the transmitter to receive the signal and illuminate the taillights;
   wherein the receiver is contained in the same structure as the lights;
   wherein a means of attachment for the receiver is provided;
   wherein a means to interface with the blinker system of the vehicle is provided.

8. The activating mechanism as described in claim 7 is a plurality of contact points.

9. The means of attachment for the receiver as described in claim 7 is a magnet.

10. The means of attachment for the receiver as described in claim 7 is a tie strap.

11. The means of attachment for the receiver as described in claim 7 is a clip.

12. The means of attachment for the receiver as described in claim 7 is a bracket.

13. The means to interface with the blinker system as described in claim 7 is a toggle switch.

14. The means to interface with the blinker system as described in claim 7 is a button.

15. The means to interface with the blinker system as described in claim 7 is a separate radio signal transmitter.

* * * * *